United States Patent
Jang et al.

(10) Patent No.: US 8,268,175 B2
(45) Date of Patent: Sep. 18, 2012

(54) METHOD FOR TRANSFERRING INORGANIC OXIDE NANOPARTICLES FROM AQUEOUS PHASE TO ORGANIC PHASE

(75) Inventors: Guang-Way Jang, Hsinchu (TW); Yin-Ju Yang, Hsinchu (TW); Mei-Chih Hung, Changhua (TW); Hsiu-Yu Cheng, Hsinchu (TW); Jian-Yi Hang, Zhonghe (TW); Jen-Min Chen, Hainchu (TW); Shu-Jiuan Huang, Taipei (TW)

(73) Assignee: Industrial Technology Research Institute (TW)

( * ) Notice: Subject to any disclaimer, the term of this patent is extended or adjusted under 35 U.S.C. 154(b) by 371 days.

(21) Appl. No.: 12/552,954

(22) Filed: Sep. 2, 2009

(65) Prior Publication Data
US 2010/0270238 A1 Oct. 28, 2010

(30) Foreign Application Priority Data
Apr. 23, 2009 (TW) ................ 98113430 A

(51) Int. Cl.
*B01D 11/00* (2006.01)

(52) U.S. Cl. ............ 210/634; 210/639; 264/5; 423/335; 423/598; 423/608; 423/610; 428/402; 428/403; 977/778; 977/779; 977/787; 977/840

(58) Field of Classification Search .......... 210/634, 210/638, 639, 749, 806; 423/592.1, 608, 423/610, 335, 598; 977/773, 787, 778, 779, 977/840; 428/402, 403; 264/5, 7; 424/489, 424/490
See application file for complete search history.

(56) References Cited

U.S. PATENT DOCUMENTS

| | | | |
|---|---|---|---|
| 3,438,735 A * | 4/1969 | Doyle | 436/60 |
| 5,013,585 A | 5/1991 | Shimizu et al. | |
| 5,028,403 A * | 7/1991 | Rickelton et al. | 423/24 |
| 6,025,455 A | 2/2000 | Yoshitake et al. | |
| 6,736,891 B1 * | 5/2004 | Bice et al. | 106/490 |
| 7,238,331 B2 * | 7/2007 | Zhou et al. | 423/1 |
| 7,985,388 B2 * | 7/2011 | Shen et al. | 423/1 |
| 2004/0147029 A1 * | 7/2004 | Adam | 436/8 |
| 2008/0095852 A1 * | 4/2008 | Kong et al. | 424/489 |
| 2008/0268062 A1 * | 10/2008 | Baran et al. | 424/490 |
| 2010/0028236 A1 * | 2/2010 | Shen et al. | 423/263 |

FOREIGN PATENT DOCUMENTS
WO 2008071248 A1 6/2008

OTHER PUBLICATIONS
Stelizig et al., "A Simple and Efficient Route to Transparent Nanocomposites," Adv. Mater. 2008, 20, 929-932.

* cited by examiner

*Primary Examiner* — Joseph Drodge
(74) *Attorney, Agent, or Firm* — Lowe Hauptman Ham & Berner, LLP

(57) ABSTRACT

A method for transferring inorganic oxide nanoparticles from aqueous phase to organic phase. A modifier is used to change the surface polarity of inorganic oxide nanoparticles, followed by using proper solvents to transfer the modified inorganic oxide nanoparticles form aqueous phase to organic phase. The organic dispersion of modified inorganic oxide nanoparticles can be combined with a polymer to provide a polymer composite with the nanoparticles uniformly dispersed therein.

16 Claims, 1 Drawing Sheet

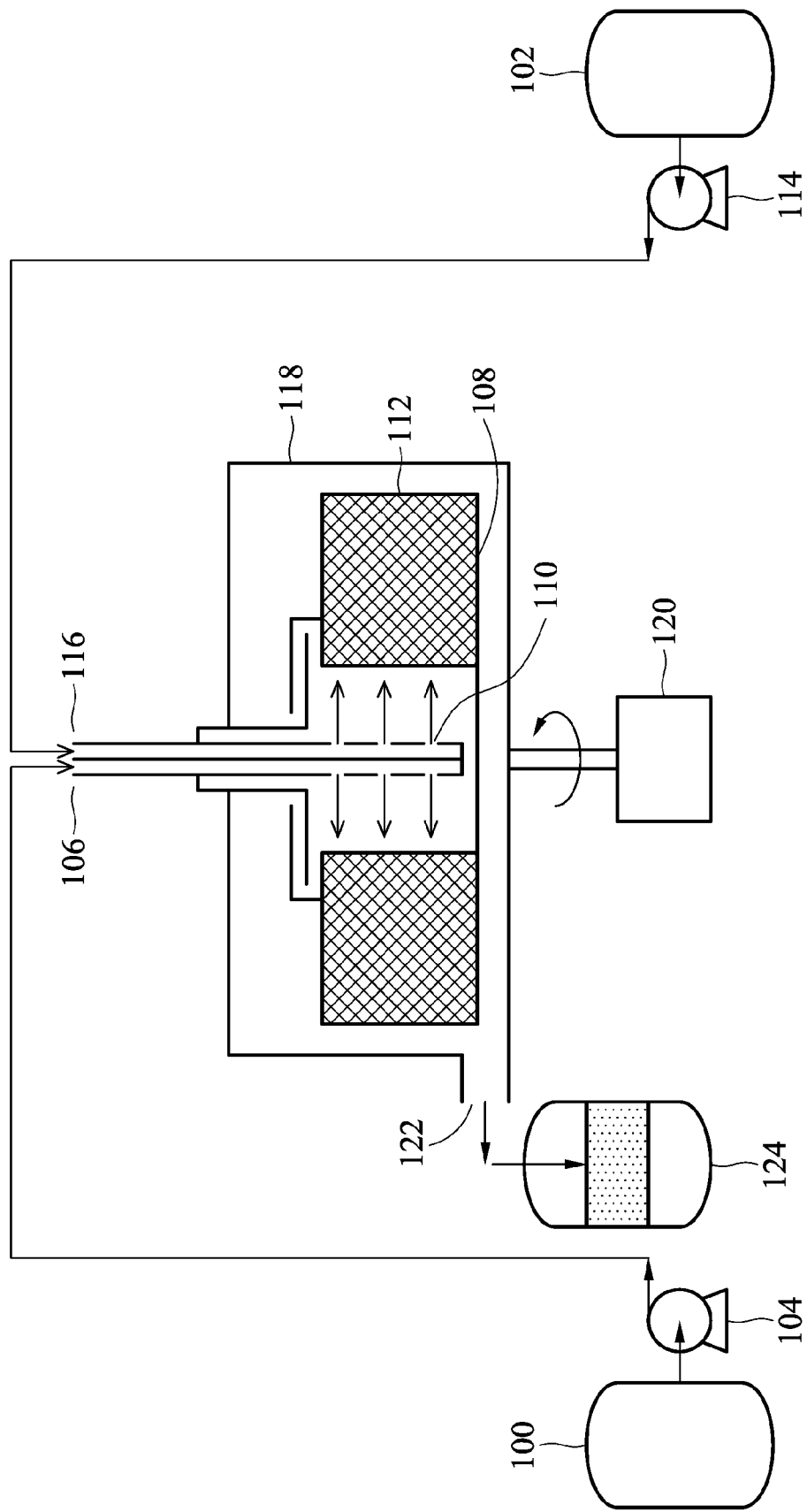

METHOD FOR TRANSFERRING INORGANIC OXIDE NANOPARTICLES FROM AQUEOUS PHASE TO ORGANIC PHASE

This application claims priority of Taiwan Patent Application No. 098113430, filed on Apr. 23, 2009, the entirety of which is incorporated by reference herein.

BACKGROUND OF THE INVENTION

1. Field of the Invention

The present invention relates to nanoparticles. More particularly, the present invention relates to a method for transferring inorganic oxide nanoparticles from aqueous phase to organic phase.

2. Description of the Related Art

Organic/inorganic composites have been developing for decades. Comparing to the pure plastics, the performance of the organic/inorganic composites such as tensile strength, thermal deformation temperature and modulus has been improved remarkably. Thus, the organic/inorganic composites have become used widely in the application of improving physical properties.

At present, the existing flexible plastic substrate materials still fail to withstand the high-temperature conditions in the manufacturing process due to their poor thermal resistance and dimensional stability. In the applications of optoelectronic field, epoxy resins are usually used as packaging materials. However, the shortcoming of epoxy resins is having an incompatible coefficient of thermal expansion with the devices. When the resin is cooled after curing, the changes of temperature may lead to cracks or breakdown of the device. Thus, inorganic additives may be added into the resins to improve the physical properties.

Nanocomposites including organic/inorganic materials have been used widely in daily necessities, 3C electronics and plastic substrates of display. Furthermore, the combination of inorganic oxide nanoparticles with polymers to form polymer nanocomposites results in more excellent properties than the conventional composites, such as enhanced mechanical properties, better dimensional stability, better thermal stability and so on. Therefore, the polymer nanocomposites could be an answer for resolving the problems about the poor thermal resistance of optoelectronic packaging materials. However, there are still some problems needed to resolve. For example, the main problem needs to be resolved is how to combine the inorganic oxide nanoparticles with polymers without aggregations, such that novel polymer nanocomposites having high-performance and multi-function may be formed.

A method of phase transfer for directly transferring the inorganic oxide nanoparticles from aqueous phase to organic phase is an easy and rapid way to disperse the hydrophilic inorganic oxide nanoparticles in the organic solvent. U.S. Pat. No. 6,736,891 discloses a method of phase transfer for modifying the inorganic oxide particles by reacting with modifiers or surfactants that the surface polarity of the inorganic oxide particles may be changed from hydrophilic to hydrophobic. Therefore, the modified inorganic oxide particles can be transferred into the organic solvent. However, the size of inorganic oxide particles is micro-scaled even by wet-milling to reduce the particle size. The micro-scaled particles may not be dispersed uniformly when combined with the polymers, resulting in poor transparency due to light scattering.

In WO Patent Publication 2008/071248, various amphiphilic block copolymers are dissolved in non-polar solvent, combined with an aqueous dispersion of silica nanoparticles and alcohol to provide a homogeneous phase. Thereafter, water is added to the mixed solution to separate organic phase and aqueous phase. The silica nanoparticles are transferred into the organic phase together with the amphiphilic block copolymers attached thereto. However, the method requires different amphiphilic block copolymers depending on the characteristics of inorganic oxides. Therefore, the method is very complicated to carry out, and the transferred nanoparticles containing about 30-40 wt % of organic component are not cost-effective.

In U.S. patent Publication 2004/147029, the organic dispersion of synthesized silica nanoparticles need huge amounts of water for diluting. Furthermore, the diluted solution needs huge amounts of high boiling point solvent for multiple distillation and phase transfer.

Therefore, in the field of polymer nanocomposites, an important issue is to develop a simple and cost-effective method for transferring the inorganic oxide nanoparticles from aqueous to organic phase. Furthermore, the method can be used to form a polymer composite with uniformly dispersed nanoparticles therein by controlling the particle size of the nanoparticles and reducing the content of organic materials attached thereon.

BRIEF SUMMARY OF THE INVENTION

The present invention provides a method for transferring inorganic oxide nanoparticles from aqueous phase to organic phase. In one embodiment, the method comprising: (a) providing an aqueous dispersion of inorganic oxide nanoparticles; (b) modifying the inorganic oxide nanoparticles by a modifier; and (c) thoroughly mixing an extracting solvent or a mixed solution of the extracting solvent and water with the aqueous dispersion of modified inorganic oxide nanoparticles of step (b) to transfer the modified inorganic oxide nanoparticles into the extracting solvent, wherein the extracting solvent and water are immiscible; and (d) collecting the extracting solvent after the extracting solvent and water are separated to different phases.

BRIEF DESCRIPTION OF THE DRAWINGS

The invention will now be described, by way of example, with reference to the accompanying drawings, in which:

FIG. 1 is a schematic view illustrating the ultra-gravity system according to one embodiment of the present invention.

DETAILED DESCRIPTION OF THE INVENTION

The present disclosure provides a method for transferring inorganic oxide nanoparticles from aqueous phase to organic phase by utilizing a modifier to modify the structure of the inorganic oxides. More specifically, organic functional groups are introduced to the surface of the inorganic oxides, thereby the surface polarity is changed. In one embodiment, the modified inorganic oxide nanoparticles may be transferred to the organic phase from the aqueous phase in a sudden homogeneous state by thoroughly mixing water, extracting solvent and modification solvent. In another embodiment, the modified inorganic oxide nanoparticles may be directly transferred to the extracting solvent from the aqueous phase. Furthermore, the modified inorganic oxide nanoparticles having organic functional groups thereon may help the modified nanoparticles dispersing uniformly in low polar organic solvent. Thus, the inorganic nanoparticles may be dispersed well when incorporated into the polymer. In one embodiment, an ultra-gravity system is employed to separate the organic phase and the aqueous phase rapidly, and the efficiency of the phase transfer is improved because the solvents or solutions are mixed more thoroughly.

The present disclosure provides a method for transferring inorganic oxide nanoparticles from aqueous phase to organic phase. In the method, an aqueous dispersion of inorganic oxide nanoparticles is provided first. It is understood that the method for transferring inorganic oxide nanoparticles that may be implemented in acidic, neutral or basic environment depending on the pH value of the aqueous dispersion of inorganic oxide nanoparticles. In one embodiment, the pH value of the aqueous dispersion of inorganic oxide nanoparticles is between about 2 and about 7. In another embodiment, the pH value of the aqueous dispersion of inorganic oxide nanoparticles is between about 7 and about 11. The inorganic oxide nanoparticles may comprise silicon dioxide, titanium dioxide, zirconium oxide or combinations thereof. In the preferred embodiment, the aqueous dispersion of inorganic oxide nanoparticles may comprise a solid content between about 5 wt % and about 30 wt %.

Then, the inorganic oxide nanoparticles are modified by a modifier. In one embodiment, a solvent for modification of the inorganic oxide nanoparticles is added for helping the modification be carried out. In the other embodiment, the modification of the inorganic oxide nanoparticles may be carried out without adding the solvent for modification. In the preferred embodiment, the solvent for modification comprises water, methanol, ethanol, isopropanol, acetone or combinations thereof. The solvent for modification may be used as a solvent of the modifying reaction and a media between the organic phase and the aqueous phase. In one embodiment, the modifier may comprise an organosilane, such as hexamethylsiloxane, iphenyldimethoxysilane, phenyltriethoxysilane, 3-glycidoxypropyl trimethoxysilane, 3-glycidoxypropyl methydiethoxysilane, 3-glycidoxypropyl triethoxysilane, n-ctyltriethoxylsilane, 3-(trimethoxysilyl)propyl methacrylate or combinations thereof. In the other embodiment, the modifier may comprise a surfactant, such as cetyl pyridinium chloride (CPC), cetyl trimethylammonium chloride (CTAC), didecyl dimethyl ammonium chloride (DDAC), polyethylene glycol (PEG), polypropylene glycol (PPG) or combinations thereof. In some embodiments, the modification of the inorganic oxide nanoparticles may be carried out at a temperature between about 50° C. and about 60° C., and the reaction time is between about 6 hours and about 18 hours.

Then, the aqueous dispersion of modified inorganic oxide nanoparticles are thoroughly mixed with an extracting solvent or a mixture of the extracting solvent and water such that the modified inorganic oxide nanoparticles may be transferred into the extracting solvent from the aqueous dispersion of modified inorganic oxide nanoparticles, wherein the extracting solvent and water are immiscible. The extracting solvent has a polarity index of about 0 to 4.4, such as ethyl acetate (4.4), diethyl ether (2.8), tetrahydrofuran (4.0), xylene (2.5), toluene (2.4), benzene (2.7), hexane (0) or combinations thereof. In one embodiment, the mixture of the extracting solvent and water comprises ethyl acetate and water in a weight ratio of the extracting solvent and water between about 1:1.2 and 1:0.3. In preferred embodiment, the ratio is about 1:1.

Then, the thoroughly mixed solution of the aqueous dispersion of modified inorganic oxide nanoparticles and the extracting solvent described above is left standing for phase separation. Thereafter, extracting solvent containing the inorganic oxide nanoparticles is collected. In addition, an ultra-gravity system may be employed to separate the extracting solvent and the aqueous dispersion to different phases rapidly. Referring to FIG. 1, which shows an ultra-gravity system according to one embodiment of the present invention. In one embodiment, the aqueous dispersion of modified inorganic oxide nanoparticles 100 is introduced through the first feeding pipe 106 into the liquid distributor 110 in the axial area of the rotating packed bed 108 by the liquid pump 104. The solutions introduced from the first feeding pipe 106 are uniformly sprayed to the annular packing 112. At the same time, the extracting solvent or the mixture of the extracting solvent and water 102 are introduced through the second feeding pipe 116 into the liquid distributor 110 in the axial area of the rotating packed bed 108 by the liquid pump 104. The mixed solutions introduced from the second pipe 116 are also uniformly sprayed to the annular packing 112. In the other embodiment, a mixed solution of the aqueous dispersion of modified inorganic oxide nanoparticles 100 and the extracting solvent or the mixture of the extracting solvent and water 102 are introduced through the first feeding pipe 106 to the liquid distributor 110 in the axial area of the rotating packed bed 108 by the liquid pump 104, and water are introduced through the second feeding pipe 116.

There is a rotating packed bed 108 disposed within the chamber 118. The rotating packed bed 108 is rotated around an axle core driven by the variable motor 120 to generate a centrifugal force to move the liquids outward rapidly and the liquids are cut into smaller droplets by the annular packing 112. The smaller droplets are contacted to each other violently to facilitate the phase transfer of the modified inorganic oxide nanoparticles. Thus, the solutions introduced from the first feeding pipe 106 and the second feeding pipe 108 may be contacted to each other violently in the form of droplets when passing through the rotating packed bed 108 and the phase transfer may be carried out. Finally, the phase-transferred solution is drained through the outlet 122 to a collecting tank 124. The phase-transferred solution is obtained in the collecting tank 124. Additionally, the phase-transferred solution has already had separated phases, i.e. organic phase and aqueous phase. Thus, the organic dispersion of modified inorganic oxide nanoparticles may be obtained by collecting the organic phase including the extracting solvent. Additionally, the modified inorganic oxide nanoparticles are dispersed uniformly in the extracting solvent.

In one embodiment, the flow velocity of feeding liquid of the ultra-gravity system may be between about 0.04 c.c./min and about 0.07 c.c./min, and the feeding liquid including immiscible solutions may be separated to different phases in few minutes. Comparing to the conventional method of standing for complete phase separation needs a few days, by using the ultra-gravity system may short the time and may improve the mixing efficiency. After the phase transfer of the modified inorganic oxide nanoparticles, the weight ratio of the modified inorganic oxide nanoparticles in the extracting solvent and in the aqueous dispersion is between about 99.7:0.3 and about 65:35.

The present disclosure provides a polymer nanocomposite with uniformly dispersed inorganic oxide nanoparticles therein. The polymer is formed by adding the organic dispersion of modified inorganic oxide nanoparticles to a polymer solution and mixed thoroughly, removing solvents contained in the polymer solution, then curing the polymer. In one embodiment, the polymer may comprise epoxy resin, acrylic, polyimide, polycarbonate or combinations thereof. The polymer solution may comprise a solvent of isopropanol, tetrahydrofuran, toluene, or combinations thereof. Furthermore, the modified inorganic nanoparticles have an organic content greater than about 5%, wherein the average particle size is between about 10 nm and about 3 μm. In preferred embodiment, the average particle size is between about 10 nm and about 12 nm. In addition, the average size of the modified inorganic oxide inorganic particles dispersed in the polymer is between about 10 nm and about 12 nm. The polymer nanocomposite has less than about 50% by weight of the inorganic oxide particles.

Example 1

100 g of isopropanol was added to 60 g of an acid silica colloid (pH=2, solid content 20%, average particle size 10 nm) and thoroughly stirred. 4.2 g of hexamethylsiloxane and 1.2 g of 3-glycidoxypropyl methydiethoxysilane were added to the above mixture and heated to 50° C. for modification for 12 hours. Next, 10 g of reaction solution was thoroughly mixed with 10 g of toluene (as extracting solvent) and allowed to stand for phase separation. The toluene phase containing silica nanoparticles was collected, wherein the average size of silica nanoparticles was 230 nm.

Example 2

The same procedure as in Example 1 was repeated except that toluene was replaced by 5 g of ethyl acetate and 5 g of water. The obtained silica nanoparticles had an average size 10 nm and about 70.6 wt % of the silica nanoparticles were transferred to ethyl acetate.

Example 3

The same procedure as in Example 1 was repeated except that toluene was replaced by hexane. The silica nanoparticles were not transferred to hexane.

Example 4

The same procedure as in Example 1 was repeated except that hexamethylsiloxane and 3-glycidoxypropyl methydiethoxysilane were replaced by 4.2 g of hexamethylsiloxane only. The obtained silica nanoparticles had an average size 716 nm.

Example 5

The same procedure as in Example 2 was repeated except that hexamethylsiloxane and 3-glycidoxypropyl methydiethoxysilane were replaced by 4.2 g of hexamethylsiloxane only. The obtained silica nanoparticles had an average size 10 nm and about 99.7 wt % of the silica nanoparticles were transferred to ethyl acetate.

Example 6

The same procedure as in Example 3 was repeated except that hexamethylsiloxane and 3-glycidoxypropyl methydiethoxysilane were replaced by 4.2 g of hexamethylsiloxane only. The silica nanoparticles were not transferred to hexane.

Example 7

The same procedure as in Example 1 was repeated except that hexamethylsiloxane and 3-glycidoxypropyl methydiethoxysilane were replaced by 4.2 g of 3-glycidoxypropyl methydiethioxysilane only. The obtained silica nanoparticles had an average size 903 nm.

Example 8

The same procedure as in Example 2 was repeated except that hexamethylsiloxane and 3-glycidoxypropyl methydiethoxysilane were replaced by 4.2 g of 3-glycidoxypropyl methydiethioxysilane only. The obtained silica nanoparticles had an average size 41 nm and about 68.6 wt % of the silica nanoparticles were transferred to ethyl acetate.

Example 9

The same procedure as in Example 3 was repeated except that hexamethylsiloxane and 3-glycidoxypropyl methydiethoxysilane were replaced by 4.2 g of 3-glycidoxypropyl methydiethioxysilane only. The silica nanoparticles were not transferred to hexane.

Example 10

100 g of isopropanol was added to 60 g of an acid silica colloid (pH=2, solid content 20%, average particle size 10 nm) and thoroughly stirred. 4.2 g of hexamethylsiloxane and 1.2 g of 3-glycidoxypropyl methydiethoxysilane were added to the above mixture and heated to 50° C. for modification for 12 hours. Next, the ultra-gravity was employed for phase transfer and phase separation. The reaction solution was introduced through the first feeding pipe and 30 g of toluene (as extracting solvent) was introduced through the second feeding pipe to the rotating packed bed to mix thoroughly, wherein the flow velocity of liquids were 0.04-0.07 c.c/min. Then, the phases-separated solution was drained from the outlet. The toluene phase containing silica nanoparticles was collected, wherein about 10.1 wt % of the silica nanoparticles were transferred to toluene.

Example 11

The same procedure as in Example 10 was repeated except that toluene was replaced by 5 g of ethyl acetate and 5 g of water. About 93.9 wt % of the silica nanoparticles were transferred to ethyl acetate.

Example 12

The same procedure as in Example 10 was repeated except that toluene was replaced by hexane. The silica nanoparticles were not transferred to hexane.

Example 13

The same procedure as in Example 10 was repeated except that hexamethylsiloxane and 3-glycidoxypropyl methydiethoxysilane were replaced by 4.2 g of hexamethylsiloxane only. About 27.8 wt % of the silica nanoparticles were transferred to toluene.

Example 14

The same procedure as in Example 11 was repeated except that hexamethylsiloxane and 3-glycidoxypropyl methydiethoxysilane were replaced by 4.2 g of hexamethylsiloxane only. About 97.9 wt % of the silica nanoparticles were transferred to ethyl acetate.

Example 15

The same procedure as in Example 12 was repeated except that hexamethylsiloxane and 3-glycidoxypropyl methydiethoxysilane were replaced by 4.2 g of hexamethylsiloxane only. The silica nanoparticles were not transferred to hexane.

Example 16

The same procedure as in Example 10 was repeated except that hexamethylsiloxane and 3-glycidoxypropyl methydiethoxysilane were replaced by 4.2 g of 3-glycidoxypropyl methydiethioxysilane only. About 8.5 wt % of the silica nanoparticles were transferred to toluene.

Example 17

The same procedure as in Example 11 was repeated except that hexamethylsiloxane and 3-glycidoxypropyl methydiethoxysilane were replaced by 4.2 g of 3-glycidoxypropyl methydiethoxysilane only. About 89.4 wt % of the silica nanoparticles were transferred to ethyl acetate.

Example 18

The same procedure as in Example 12 was repeated except that hexamethylsiloxane and 3-glycidoxypropyl methydiethoxysilane were replaced by 4.2 g of 3-glycidoxypropyl methydiethoxysilane only. The silica nanoparticles were not transferred to hexane.

In the above examples, while hexamethylsiloxane was used as a modifier and the mixture of ethyl acetate and water (weight ratio=1:1) was used as an extracting solvent in example 5, which shows the best result that the silica nanoparticles have almost completely transferred to ethyl acetate; while hexane (polarity index=0) was used as an extracting solvent in example 6, phase transfer was not occurred. Additionally, while the ultra-gravity system was employed, such as in examples 10 to 18, the mixing efficiency of solutions was improved such that more silica nanoparticles were transferred to the extracting solvent than in examples 1 to 9.

Example 19

3.9 g of 3-glycidoxypropl methydiethioxysilane was added to 20 g of water and thoroughly stirred until the solution was transparent. Thereafter this mixture was stirred in 50 g of isopropanol. 50 g of a basic silica colloid (pH=10, solid content 30%, average particle size 10 nm) were added to the above mixture at room temperature for modification for 3 hours. Next, 10 g of the reaction solution were mixed thoroughly with 5 g of ethyl acetate and 5 g of water by ultra-gravity system for phase transfer and phase separation. The ethyl acetate phase containing silica nanoparticles was collected, wherein the average size of the silica nanoparticles was 25 nm.

Example 20

0.865 g of n-octyltriethoxysilane was added to 10 g of titanium dioxide colloid (pH=1, solid content 5%, average particle size 7.2 nm) and thoroughly mixed for 3 hours. The above mixture was added to 20 g of isopropanol and thoroughly mixed. Next, 2 g of the above reaction solution was thoroughly mixed with 8 g of a mixed solution of hexane and water by the ultra-gravity system fro phase transfer and phase separation. The hexane phase containing titanium dioxide nanoparticles was collected, wherein about 88.8 wt % of titanium dioxide nanoparticles were transferred to hexane, the average size was 19.22 nm.

Example 21

1.512 g of 3-(trimethoxysilyl)propyl methacrylate was added to 10 g of zirconium oxide colloid (pH=10, solid content 30%, average particle size 4 nm) and thoroughly mixed for 1 hours. The above mixture was added to 12 g of isopropanol and thoroughly mixed. Next, 10 g of the above reaction solution was thoroughly mixed with 9 g of the mixture of ethyl acetate and water by the ultra-gravity system for phase transfer and phase separation. The ethyl acetate phase containing zirconium oxide nanoparticles was collected, wherein about 65.8 wt % of zirconium oxide nanoparticles were transferred to ethyl acetate, the average size was 34 nm.

Example 22

0.17 g of cetyl pyridinium chloride was completely dissolved in 5 g of water and added to 3 g of a basic silica colloid (pH=10, solid content 30%, average particle size 10 nm) and thoroughly mixed. Next, 8 g of hexane was added to the reaction solution and was shook with the reaction solution for 5 minutes for phase transfer. Then, 10 g of water was added in. Repeat the above steps of phase transfer and water adding for 4 times. The phase-transferred solution was left standing for phase separation. The hexane phase containing silica nanoparticles was collected, wherein about 90 wt % of silica nanoparticles were transferred to hexane, the average size was 1.44 μm.

Example 23

The same procedure as in Example 22 was repeated and 0.2 ml of hexane containing silica nanoparticles was diluted in 100 times of volume of toluene. The average size of silica nanoparticles was 1.69 μm.

Example 24

The same procedure as in Example 23 was repeated except that toluene was replaced by methanol. The average size of silica nanoparticles was 2.63 μm.

Example 25

The same procedure as in Example 23 was repeated except that toluene was replaced by alcohol. The average size of silica nanoparticles was 897 mm.

Example 26

The same procedure as in Example 23 was repeated except that toluene was replaced by tetrahydrofuran. The average size of silica nanoparticles was 997 nm.

Un examples 22 to 26, surfactants was used as a modifier. In example 25 and 26, when alcohol and tetrahydrofuran having relatively higher polarity index were used as diluting solvent, the silica nanoparticles had a smaller average particle size, which reveals the polarity index and the solubility of the solvents may be important factors to control the average size of the inorganic oxide nanoparticles.

Example 27

100 g of the ethyl acetate dispersion of silica nanoparticles obtained in example 10 (average size 10-12 nm, of organic content of modified nanoparticles 7.98 wt %) were added to 600 g of isopropanol, and water therein was removed at 50° C. in vacuum. Then, epoxy resin dissolving in isopropanol was added in and mixed thoroughly, wherein the epoxy resin had about 20%-50 wt % of silica nanoparticles contained therein. Solvents contained in the solution were removed in vacuum and the remained epoxy resin was curried at 170° C., wherein the epoxy resin having wall dispersed silica nanoparticles had transmittance 90% (wavelength 550 nm), yellow index 7.0, and glass transition temperature 182. The silica nanoparticles contained in the polymer composite had an average size about 10-12 nm.

The present invention provides an easy and cost-effective method to transfer the inorganic oxide nanoparticles from aqueous phase to organic phase without designing and synthesizing specific amphiphilic polymers. Furthermore, the method comprises using a modifier to modify the surface structure of the inorganic oxide nanoparticles and tuning the polarity of solvent to facilitate the transferring of the inorganic oxide nanoparticles from aqueous phase to organic phase. Additionally, the inorganic oxide nanoparticles can be dispersed in organic solvent uniformly results in the inorganic oxide nanoparticles can be also dispersed uniformly in polymer. The present invention further comprises employing an ultra-gravity system to separate the extracting solvent and aqueous dispersion rapidly and to mix the solvents thoroughly which makes the inorganic oxide nanoparticles have more chances to transfer to the extracting solvent. The present invention also provides a polymer nanocomposite formed by the organic dispersion of inorganic oxide nanoparticles including well dispersion. Thus, the thermal resistance and dimensional stability of the polymer nanocomposite may be improved remarkably which can be further used in the optoelectronics industry.

While the preferred embodiments of the invention have been described above, it will be recognized and understood that various modifications can be made in the invention and the appended claims are intended to cover all such modifications which may fall within the spirit and scope of the invention.

What is claimed is:

1. A method for transferring inorganic oxide nanoparticles from aqueous phase to organic phase, comprising:
    (a) providing an aqueous dispersion of inorganic oxide nanoparticles;
    (b) modifying the inorganic oxide nanoparticles by a modifier, wherein the modifier is selected from hexamethylsiloxane, 3-glycidoxpropryl methydiethoxysilane, 3-(methoxysilyl) propyl methccrylate and n-octyltriethoxysilane;
    (c) thoroughly mixing a mixed solution of an extracting solvent and water with the aqueous dispersion of modified inorganic oxide nanoparticles of step (b) to transfer the modified inorganic oxide nanoparticles into the extracting solvent, wherein the extracting solvent and water in the mixed solution is in a weight ratio between about 1:1.2 and 1:0.3, wherein the extracting solvent is ethyl acetate or hexane; and
    (d) after the extracting solvent and all of the water obtained from the above steps are respectively separated to an organic phase and an aqueous phase, collecting the organic phase including the extracting solvent.

2. The method of claim 1, further comprising adding a solvent for modification for helping the modifier modify the inorganic oxide nanoparticles in step (b).

3. The method of claim 2, wherein the solvent for modification comprises water, methanol, ethanol, isopropanol, acetone or combinations thereof.

4. The method of claim 1, wherein the aqueous dispersion of inorganic oxide nanoparticles has a solid content greater than about 5%.

5. The method of claim 1, wherein a pH value of the aqueous dispersion of inorganic oxide nanoparticles is between about 2 and about 7.

6. The method of claim 1, wherein a pH value of the aqueous dispersion of inorganic oxide nanoparticles is between about 7 and about 11.

7. The method of claim 1, wherein the inorganic oxide nanoparticles comprise silicon dioxide, titanium dioxide, zirconium oxide or combinations thereof.

8. The method of claim 1, wherein the modified inorganic oxide nanoparticles have an organic content greater than about 5 wt %.

9. The method of claim 1, wherein after the modified inorganic oxide nanoparticles are transferred, the ratio of the modified inorganic oxide nanoparticles in the extracting solvent and in the aqueous dispersion is between about 99.7: 0.3 and about 65: 35.

10. The method of claim 1, wherein step (c) is carried out by an ultra gravity system.

11. The method of claim 10, further comprising:
    introducing the aqueous dispersion of modified inorganic oxide nanoparticles of step (b) through a first feeding pipe to a rotating packed bed rotated around an axle core, and introducing the mixed solution of the extracting solvent and water through a second feeding pipe to the rotating packed bed to mix with the aqueous dispersion, mixing all solutions in the rotating packed bed, and collecting a phase-transferred solution from an outlet.

12. The method of claim 11, further comprising:
    (a) adding the organic phase including the extracting solvent of step (d) of claim 1 into a polymer solution and thoroughly mixed;
    (b) removing solvents contained in the polymer solution; and
    (c) curing the polymer solution to provide a polymer containing the inorganic oxide nanoparticles dispersed therein.

13. The method of claim 10, further comprising:
    introducing a mixed solution of the aqueous dispersion of modified inorganic oxide nanoparticles of step (b) and the mixed solution of the extracting solvent and water through a first feeding pipe to a rotating packed bed rotated around an axle core, and introducing water through a second feeding pipe to the rotating packed bed, mixing all solutions in the rotating packed bed, and collecting a phase-transferred solution from an outlet.

14. The method of claim 12, wherein the polymer comprises epoxy resin, acrylic, polyimide, polycarbonate or combinations thereof.

15. The method of claim 12, wherein the polymer solution comprises a solvent of isopropanol, tetrahydrofuran, toluene or combinations thereof.

16. The method of claim 12, wherein the polymer has less than 50 wt % of the inorganic oxide nanoparticles.

* * * * *